July 12, 1966         H. NERWIN         3,260,182
MAGAZINE AND CAMERA WITH FILM CHARACTERISTIC INDICATING MEANS
Original Filed Jan. 2, 1962         11 Sheets-Sheet 2
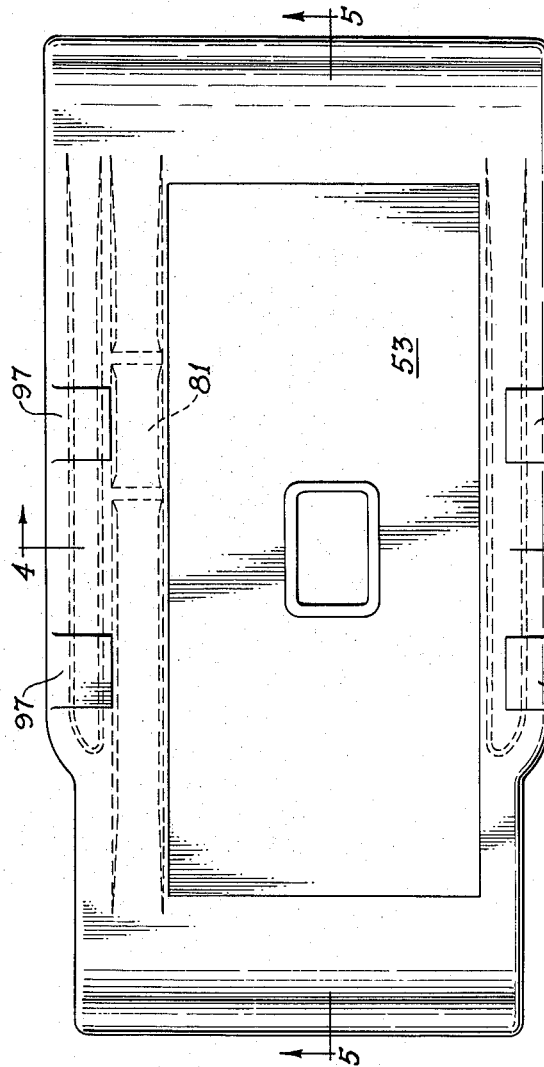
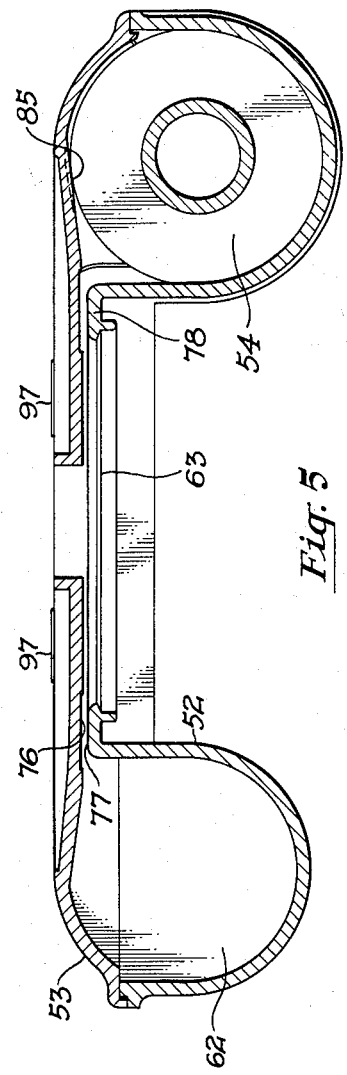
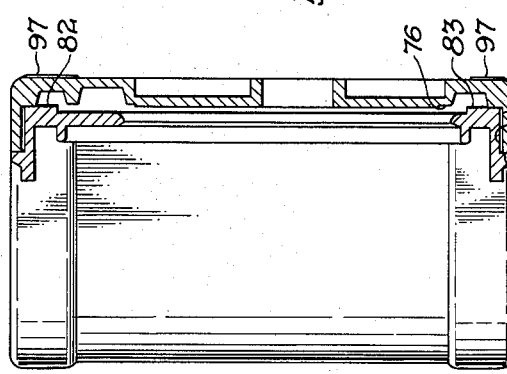
*Hubert Nerwin*
INVENTOR.

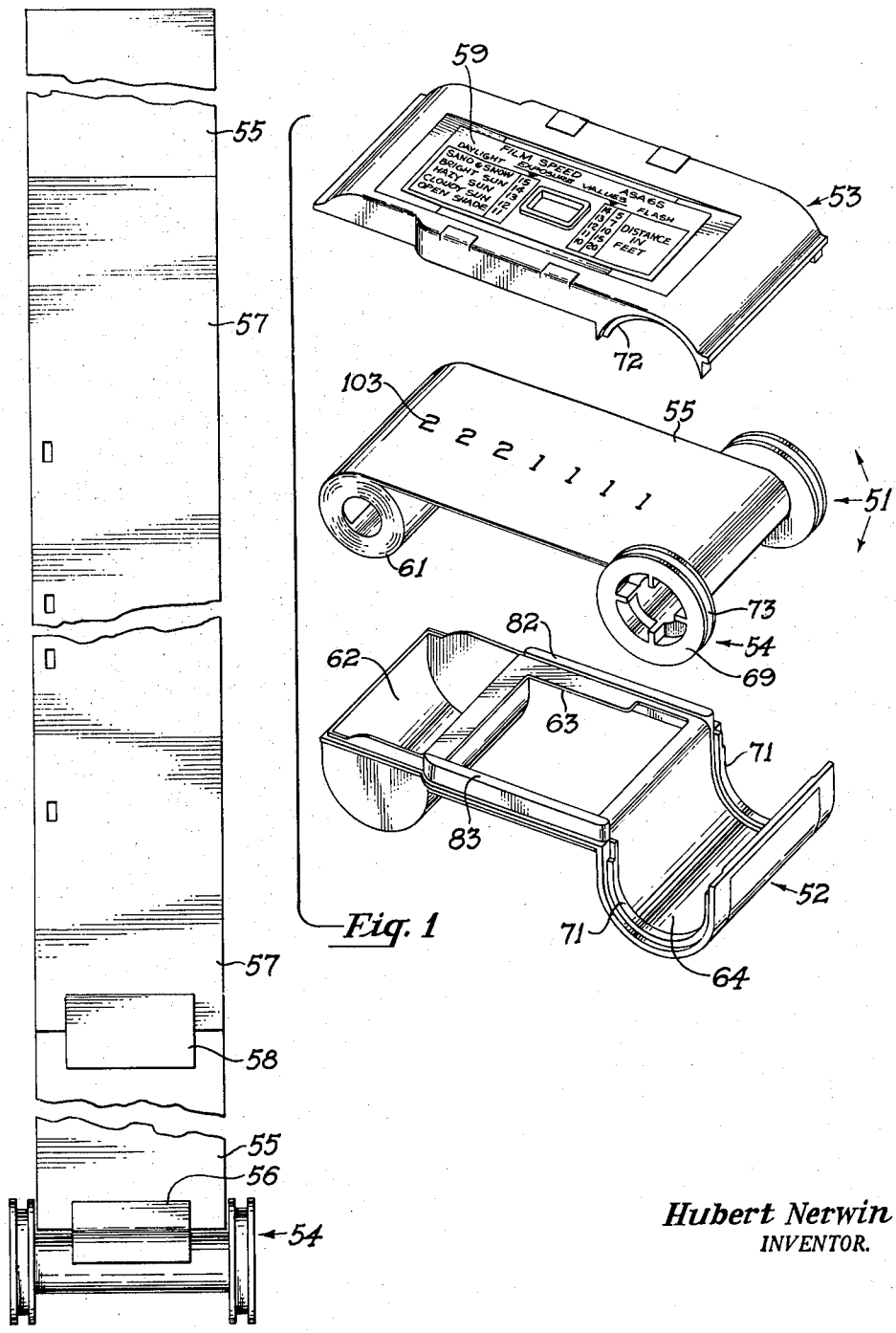

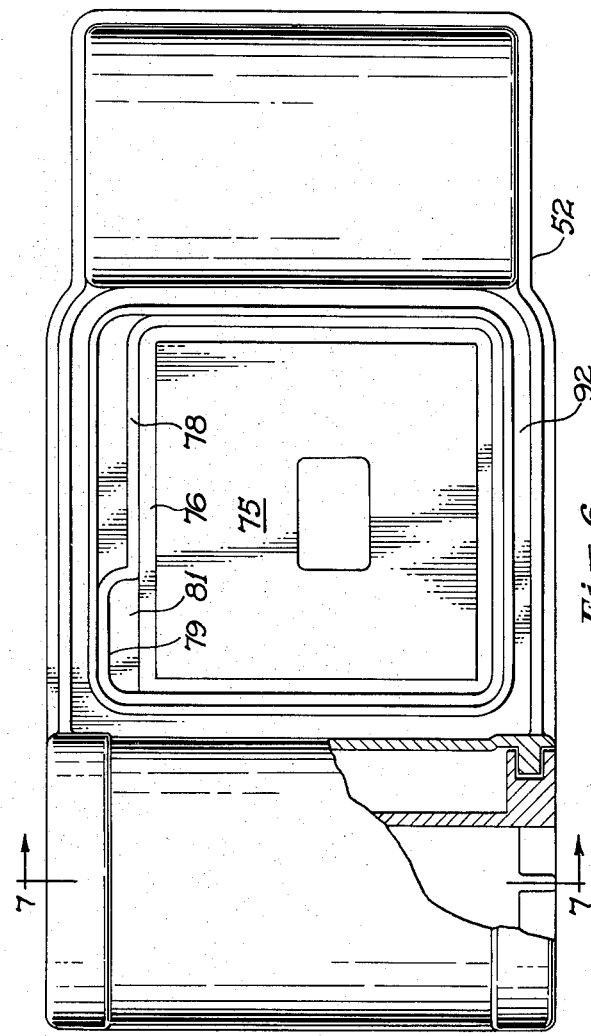
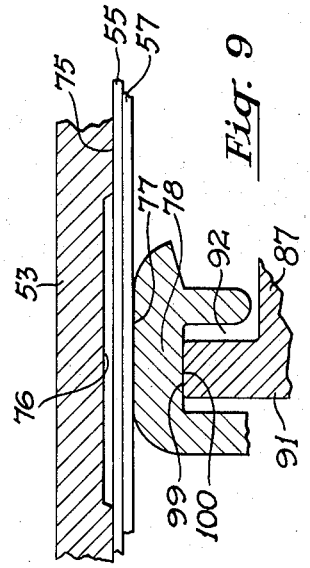
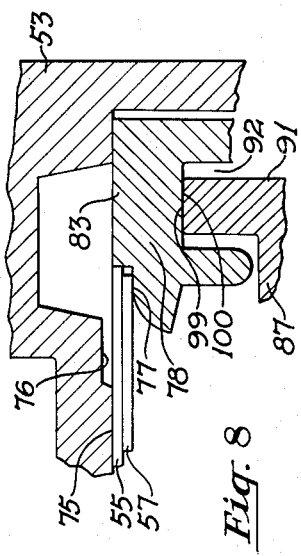
Hubert Nerwin
INVENTOR.

July 12, 1966  H. NERWIN  3,260,182
MAGAZINE AND CAMERA WITH FILM CHARACTERISTIC INDICATING MEANS
Original Filed Jan. 2, 1962  11 Sheets-Sheet 6

Hubert Nerwin
INVENTOR.

Hubert Nerwin
INVENTOR.

Hubert Nerwin
INVENTOR.

July 12, 1966 H. NERWIN 3,260,182
MAGAZINE AND CAMERA WITH FILM CHARACTERISTIC INDICATING MEANS
Original Filed Jan. 2, 1962 11 Sheets-Sheet 10
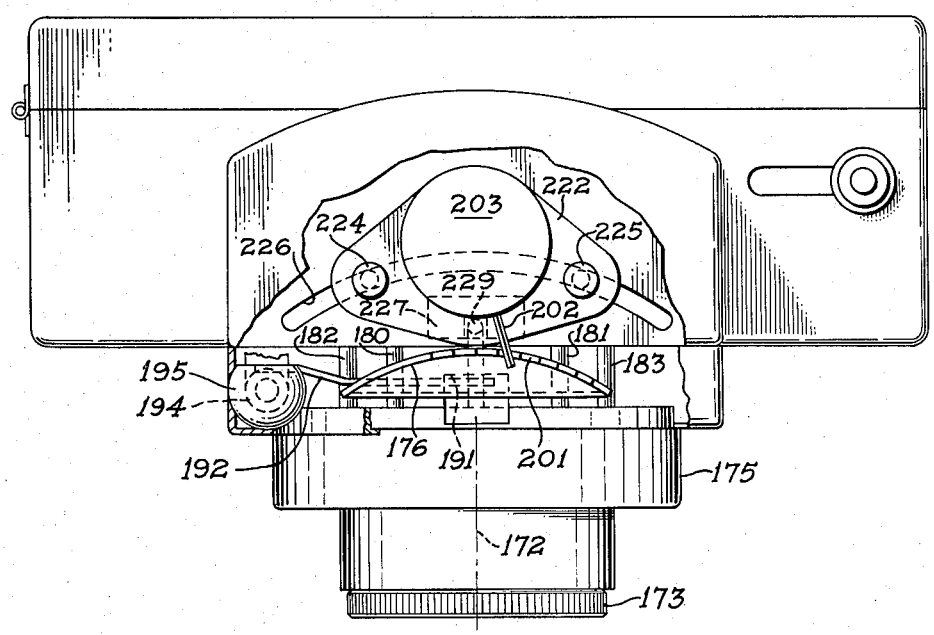
Fig. 20
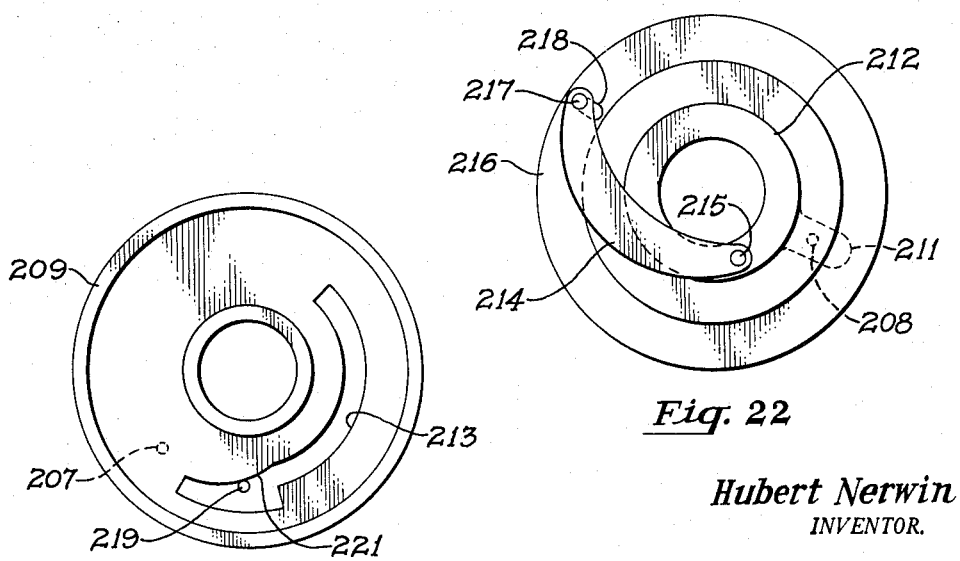
Fig. 21
Fig. 22
Hubert Nerwin
INVENTOR.

July 12, 1966 H. NERWIN 3,260,182
MAGAZINE AND CAMERA WITH FILM CHARACTERISTIC INDICATING MEANS
Original Filed Jan. 2, 1962 11 Sheets-Sheet 11

Hubert Nerwin
INVENTOR.

United States Patent Office 3,260,182
Patented July 12, 1966

3,260,182
MAGAZINE AND CAMERA WITH FILM CHARACTERISTIC INDICATING MEANS
Hubert Nerwin, Rochester, N.Y., assignor to Eastman Kodak Company, Rochester, N.Y., a corporation of New Jersey
Continuation of application Ser. No. 163,843, Jan. 2, 1962. This application Jan. 11, 1965, Ser. No. 424,615
20 Claims. (Cl. 95—31)

This application is a continuation-in-part of application Serial No. 109,294, filed May 11, 1961, now Patent No. 3,194,132, issued July 13, 1965, and is a continuation of U.S. application Serial No. 163,843, filed January 2, 1962, now abandoned.

The present invention relates to photographic still cameras and roll film magazines for use therein and more particularly to cameras and magazines therefor of the general type described in pending U.S. patent application Serial No. 129,303, filed Aug. 4, 1961, in the name of Douglass S. Harvey, which issued June 23, 1964 as U.S. Patent No. 3,138,084. Still more particularly, the invention relates to such magazines comprising molded plastic components and provided with physically detectable coding means indicative of the characteristics of the film in the magazine, e.g., the type and speed; and to cameras having means for effecting an appropriate adjustment of a camera mechanism in response to the coding means of a magazine installed therein.

While the magazine construction disclosed and described in the above-cited Harvey patent overcomes many disadvantages of prior magazines, a principal object of the present invention is to further simplify the construction of such magazines to reduce the cost thereof to such an extent that the magazines may be loaded at the factory and discarded by the film processor without prohibitive expense to the customer.

Another object of the invention is to increase the rigidity of such magazines to minimize distortion of the film plane and to improve the means for accurately locating the film plane with respect to the camera lens system; whereby such a magazine may be used not only in simple cameras having a relatively small lens aperture and a relatively large acceptable circle of confusion, and consequently a relative large permissible deviation in the location of the film plane relative to the lens system, but also in more refined cameras in which a larger lens aperture and/or a smaller acceptable circle of confusion dictates more accurate positioning of the film in the focal plane.

Still another object of the invention is to further improve the light sealing means of such magazines without employing separate light sealing elements.

Yet another object of the invention is to facilitate the assembly of such a magazine by so forming the magazine body members that loading the magazine comprises merely laying a roll of unexposed film and a film spool attached thereto in corresponding receptacles in one of the body members, closing the magazine by means of another body member, and joining the body members together.

In all but the very simplest cameras, means are provided for adjusting the shutter speed and/or the lens diaphragm opening to vary the exposure of the film. Regardless of the means used for determining or regulating the exposure, the speed or sensitivity of the particular film used in the camera must be taken into consideration. In lieu of using a light meter or a camera having a built-in photo-electric exposure control mechanism, the exposure adjustments are commonly made by reference to a simple table showing appropirate settings for film of a particular sensitivity under various conditions of illumination. Such tables are customarily supplied with the film. If, however, the camera user does not have the appropriate table when he takes a photograph, or, if he has forgotten the type of film in the camera, his film is apt to be improperly exposed. Another object of the invention is therefore to provide a disposable magazine with an appropriate exposure table permanently attached thereto and to provide a camera adapted to accommodate such a magazine with means whereby the table is visible from the exterior of the camera.

To eliminate the need for a separate exposure table and to simplify the determination of proper exposure settings, many cameras are provided with devices which, when set to an index number corresponding to the sensitivity of the film being used, provide criteria for effecting proper shutter adjustments under various light conditions. A simple and common form of such a device comprises a movable dial attached to the camera which, when moved to a position corresponding to the type of film in the camera, indicates proper shutter settings for various light conditions. Similar dials may be located concentrically about the shutter mechanism in such a manner that aligning a movable pointer on the shutter control mechanism with a mark on the dial indicating a particular light condition causes the shutter to be appropriately adjusted. Such dials may also be provided with additional data, for example, to indicate the distance range within which flash pictures may be taken using the particular type of film in the camera with various types of flash lamps.

In more elaborate cameras, including those provided with built-in light meters or photo-electric exposure devices for automatically controlling the exposure mechanism, adjusting means are likewise provided which must be set in accordance with the speed or sensitivity of the film being used in order to achieve proper exposures. With all of these devices a common cause of faulty exposures arises from the failure of the photographer to correlate the adjustment means with the sensitivity rating of the film being used. To eliminate this error, still another object of the present invention is to provide disposable factory loaded film magazines with mechanically detectable coding means indicative of the speed or sensitivity of the film therein and to provide cameras adapted to utilize such magazines with simple mechanisms for detecting the position of such coding means and for appropriately adjusting the exposure indicating or regulating mechanism of the camera in accordance therewith.

Previous attempts to code film magazines have involved providing a magazine with a rigid projection, the location or dimension of which is indicative of the type of film in the magazine. Where such magazines are adapted to be reloaded at the factory, it has also been suggested that this coding means be made movable to various coding positions to eliminate the need for sorting the used magazines and reloading them with the type of film for which they were originally coded. Such a requirement is, of course, eliminated by the disposable magazine of the present invention. An obvious disadvantage to all of the foregoing coding constructions resides in the additional elements and manufacturing steps required to produce a finished coded magazine. It is therefore still another object of the present invention to simplify the construction of coded plastic film magazines by providing such a magazine with an integral member, various portions of which may be subsequently removed in a simple manner to provide a mechanically detectable coded indication of the type of film in the magazine.

Somewhat akin to the necessity of identifying the speed or sensitivity of the film in the magazine at the time it is exposed is the requirement that the film be identified according to its type in order to develop and process it correctly. By providing magazines with coding means, this step, which has previously been accomplished by visual inspection, may be carried out by automatic sorting equipment. The coding means indicative of the film speed are not alone sufficient to identify the film for processing since, for example, color film may have the same film speed rating as black and white film but must be processed by an entirely different procedure. It is therefore still another object of the present invention to facilitate automatic sorting of film magazines according to film type by providing such magazines with tactile film type coding means which may be similar to the coding means used for identifying the sensitivity of the film in the magazine.

Other objects of the invention will appear from the following description, reference being made to the accompanying drawings in which:

FIG. 1 is an exploded perspective view of a loaded film magazine according to a preferred embodiment of the invention;

FIG. 2 is a broken plan view of the roll film and backing paper used in the magazine as seen from the film side;

FIG. 3 is a rear elevational view of the film magazine;

FIG. 4 is a sectional view of an empty magazine taken along the lines 4—4 of FIG. 3;

FIG. 5 is a sectional view taken along the lines 5—5 of FIG. 3;

FIG. 6 is a partial sectional front elevational view of the empty film magazine;

FIG. 7 is a sectional view taken along the lines 7—7 of FIG. 6;

FIG. 8 is an enlarged portion of FIG. 4 showing the means employed to support and locate one edge of the film and backing paper in the exposure plane in the magazine;

FIG. 9 is an enlarged portion of FIG. 5 showing the light sealing means employed in the film passageway of the film supply chamber of the magazine;

FIG. 20 is a top view, partly broken away, of the mechanism shown in FIGS. 18 and 19;

FIG. 21 is a front view of a portion of the shutter speed control mechanism of the camera depicted in FIGS. 18–20.

FIG. 22 is a front view of a portion of the diaphragm control mechanism of the camera depicted in FIGS. 18–20.

The film magazine

Figure 10:
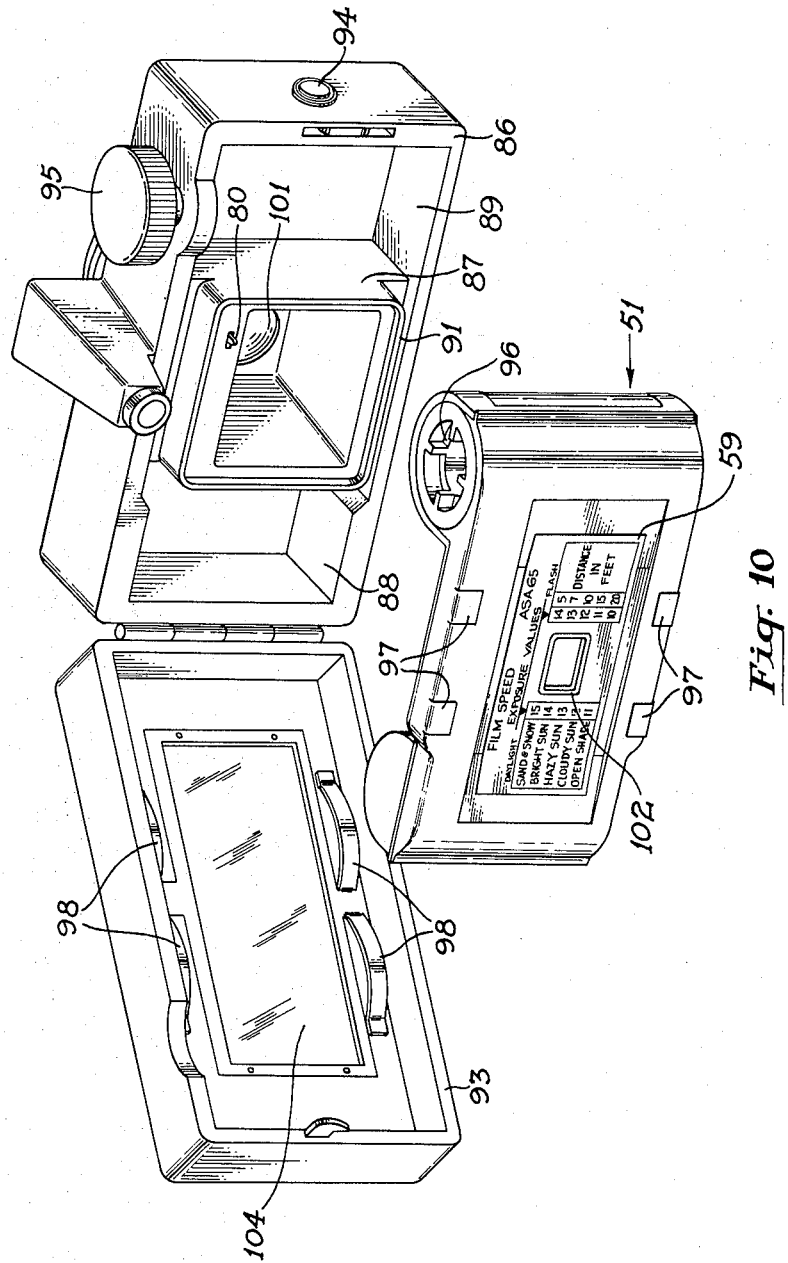
FIG. 10 is a perspective view of a camera according to the present invention showing a magazine in position for insertion into the camera.

*General description.*—As is readily apparent from FIGS. 1–11 and more particularly from FIGS. 1 and 2, a loaded film magazine 51 of a preferred form of the present invention comprises a molded plastic magazine body 52, a molded plastic magazine cover 53, a molded plastic spool 54, a strip of light protective paper 55 attached to take-up spool 54 by an adhesive paster 56, a length of film 57 attached to the protective paper 55 by a second adhesive paster 58 and a film identification and exposure guide 59 attached to the magazine cover 53. In the assembled magazine the film is initially wound upon itself to form a film supply roll 61 which is housed in the film supply chamber 62 formed by the cooperation of the magazine body and the magazine back as illustrated in cross section in FIG. 5, with the backing paper extending across the magazine exposure opening 63 and attached to spool 54 located in the film spool chamber 64. With the magazine components so disposed, the cover member 53 is cemented or otherwise permanently joined to the magazine body 52. Since the magazine is not intended to be reloaded, an exposed roll of film is removed therefrom for processing by breaking the magazine open.

*Light sealing means.*—In order to prevent light from entering the magazine along the mating edges of the body and the cover member, these edges are provided at all points with closely fitting mating surfaces normal to the adjacent outer surface of the magazine, as shown for example at 65 and 66 of FIG. 4 and with contiguous mating surfaces as shown for example at 67 and 68 at right angles thereto to effectively block the entry of light through the joint. As is most clearly illustrated in FIGS. 1 and 7, the light sealing means employed at the ends of the film take-up chamber to prevent light leakage past the spool flanges 69 comprise annular ribs 71 and 72 on the magazine body 52 and the cover 53 respectively, which engage circumferential grooves 73 in each of the spool flanges 69 to rotatably support and locate the film spool. The junctures of the ribs are protected against light leakage by overlapping mating surfaces as previously described.

*Magazine film gate and film passageways.*—According to the present invention, the portion of film to be exposed is accurately supported in a flat plane behind the magazine exposure opening by means integral with the molded magazine components, and the magazine itself is accurately located in the camera, as described later, to insure that the film in the exposure opening lies in the focal plane of the camera lens system. To support the film in a flat plane, the magazine cover is provided with a flat rectangular surface 75 surrounded by a shallow recess 76 as shown in plan view by FIG. 6 and in cross section in FIGS. 4, 5, 8 and 9. The film and backing paper are maintained in flat supported engagement with surface 75 by the engagement of the film with a rectangular rearwardly facing surface 77 of the magazine wall 78 surrounding the exposure opening opposite recess 76 and spaced forwardly of surface 75 by a distance closely approximating the combined thickness of the film and paper. Thus, as shown in enlarged views in FIGS. 8 and 9, the film and paper are maintained in flat relation against surface 75 due to their natural resistance to being simultaneously flexed in transverse directions. In case the combined thickness of the film and paper is slightly greater than the distance between the planes of surfaces 75 and 77, the film and paper are bowed slightly into recess 76 without materially effecting the flatness of the film in the exposure plane or causing the film to bind as it is wound across the opening. Along the top edge of the exposure opening, the magazine wall 78 is provided with a notch 79 to accommodate the end of a metering member, as shown at 80, in FIG. 10, which is adapted to extend through the film and into a recess 81 in the magazine cover as described in the above-mentioned Harvey patent. Since the film extends beyond the top of the notch, however, the continuous surface 77 is narrowed but not completely interrupted thereby.

FIG. 9 is an enlarged cross sectional view of the film passageway into the film supply chamber, the same construction, also being employed in the passageway of the spool chamber as shown in FIG. 5. As previously explained, the film is maintained in contact with surface 77 of wall 78 by virtue of the resiliency of the film and paper and the correspondence between the combined thickness of the film and paper and the spacing of surfaces 75 and 77. The intimate contact thus obtained between the film and surface 77 eliminates the need for additional light sealing elements such as plush or felt, and thereby the possibility of contaminating the film with lint or other foreign matter originating in the light seal. Since recess 76 is wider than opposing wall 78, the passageway may freely accommodate the adhesive paster 58 which must pass therethrough during the initial film winding operation.

After the film and paper have been completely wound onto the take-up spool, the passageway is obviously no longer completely light tight. At this stage of the winding operation, however, the trailing end of the backing paper has been wound upon the spool over the exposed film and substantially reduces the danger of the film being fogged by any slight amount of light entering through the passageway of the spool chamber. As a means of further protecting the fully exposed film in the spool chamber, cameras adapted to accommodate such magazines may be provided with film metering mechanisms, as described in the above-identified Harvey patent, which limit the final winding operation of the camera to cause the end of the backing strip to remain in the passageway of the spool chamber. While the presence of the paper alone in the passageway does not provide quite as effective a light seal as does paper and film together, this arrangement, in conjunction with the backing paper wound over the exposed film on the spool, substantially eliminates the danger of fogging the film.

*Film guiding means.*—As the film and paper are wound from the supply chamber into the spool chamber, the lateral freedom of the strips in the area of the film gate is limited by edge guides 82 and 83, molded integrally with the magazine body 52 as most clearly illustrated in FIGS. 1, 4 and 8. These guide members accurately center the film and paper in the film gate and guide it onto the spool while providing just sufficient lateral freedom to allow for slight variations in the width of the strips. As an additional means of preventing the film from riding over the flanges 69 of the spool 54 and causing jamming or damage to the film, the semi-cylindrical internal surface 84 of the spool chamber located between the spool flanges is of smaller radius than the flanges as shown in FIG. 7. At the point where the film strip enters the spool chamber, similar means are employed on the magazine cover, as shown at 85 of FIGS. 5 and 7, to guide the film between the spool flanges.

*Magazine locating means.*—As shown in FIG. 10, a camera adapted to accommodate a magazine according to the present invention may comprise in a preferred embodiment a main housing 86 provided with a central box-like member 87 located between two chambers 88 and 89 adapted respectively to freely accommodate the film supply and spool chamber portions of the magazine. A continuous rearwardly projecting rib 91 is provided along the rearward portion of member 87, and is adapted to be received by a corresponding continuous channel 92 surrounding the exposure opening of the magazine as illustrated in FIGS. 6, 8 and 9. To load the camera, the hinged cover member 93 is released by means of latch member 94 and is moved to the position illustrated. After the film winding knob 95 is withdrawn, as shown, to retract the spool engaging key, not shown, from chamber 89, the magazine is placed in the camera with rib 91 in mating relation with channel 92. The cover member may then be closed and the winding knob depressed to engage the key with a suitable clutch member 96 formed in one of the flanges of the film take-up spool. With the cover in its closed position behind the magazine, pressure pads 97 on the magazine are engaged by spring members 98 on the hinged cover member to urge the magazine forward with the bottom surface 99 of channel 92 in contact with the rear surface 100 of rib 91, thereby accurately locating the film plane of the magazine with respect to the camera lens system 101. To prevent distortional influences on the magazine in the camera, the lateral positioning of the magazine is determined by the lateral freedom of rib 91 in channel 92 so that other portions of the magazine are held out of contact with the camera housing. As is readily apparent, the cooperating rib and slot structure between the camera and magazine also serves to provide a labyrinth light barrier between the two units so that of the camera components, only the box-like member 87 need be light-tight.

*Exposure guide label.*—As illustrated in FIGS. 1 and 10, an exposure guide label 59 appropriate to the particular type of film in a magazine may be attached to the cover thereof in the area surrounding aperture 102 through which exposure indicating numerals 103, FIG. 1, are visible. With the magazine installed in the camera, the exposure guide label and the exposure indicating numeral aligned with the aperture are visible through window 104 in hinged cover member 93. Since the magazine is not intended to be reused, the appropriate label may be permanently attached to the loaded magazine or, if desired, an appropriate guide might be molded into the magazine back prior to assembling the magazine, in which case, of course, the advantage of being able to load all kinds of film into the same magazine components would be lost.

Figure 11:
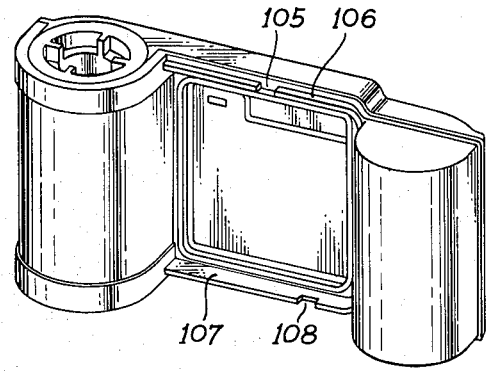
FIG. 11 is a perspective front view of the magazine showing one embodiment of magazine coding means.
Figure 12:
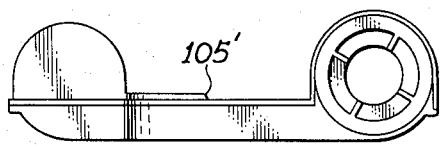
FIG. 12 is a top view of a magazine showing an alternative embodiment of magazine coding means.
Figure 13:
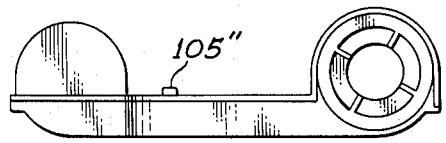
FIG. 13 is a top view of a magazine showing another alternative embodiment of magazine coding means.

*Magazine coding means.*—In order to enable an element of a camera to be automatically adjusted according to the sensitivity of the film in a magazine, a physically detectable coding means may be provided on the magazine as shown in a preferred embodiment in FIGS. 11 through 13. In FIG. 11, this coding means comprises a coding notch 105, the position of which along the forwardly projecting rib 106 is empirically determined as a function of the sensitivity or speed of the particular film loaded in the magazine. For example, as viewed in FIG. 11, the higher the film speed, the further notch 105 would be from the left end of rib 106. FIGS. 12 and 13 show alternate coding means in which the position of an abutment shoulder 105' or a projection 105" along the rib is determined by the speed of the film in a magazine. It should be noted that all of these coding means comprise the removal of material from the rib rather than the addition of material, thereby affording a simple means of coding a standard magazine after it has been loaded with film. The removal of the material from the rib is preferably accomplished by punching out a solid section or by locally melting the rib rather than by a sawing or grinding technique, in order to prevent contaminating the magazine with dust or shavings.

A second coding notch or similar means may also be provided on the magazine along rib 107 as shown at 108 in FIG. 11. The position of this coding means along the rib is empirically determined as a function of the type of film in the magazine in order that exposed magazines may be automatically sorted prior to being processed. If a greater range of values were to be coded along either of the ribs than would be practical by means of a single abutment surface, two or more such surfaces might be employed along the rib, for example, in a binary coding system.

Figure 14:
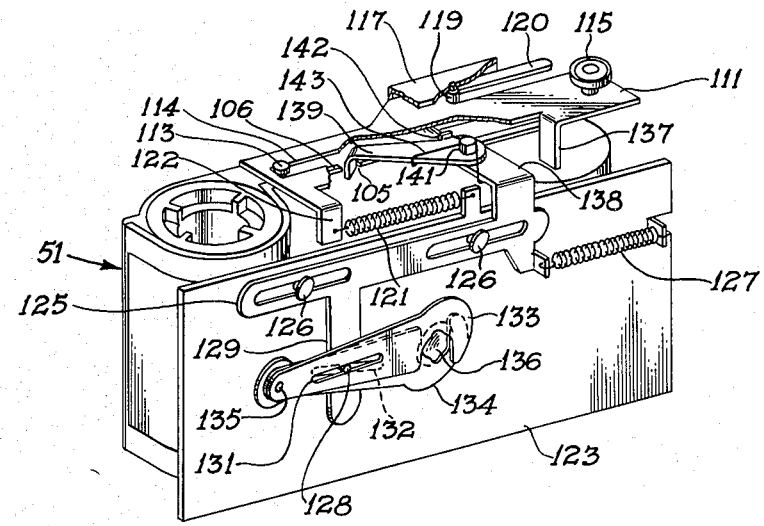
FIG. 14 is a perspective view of a camera mechanism for adjusting a lens diaphragm in response to the coding means on a magazine installed in the camera.
Figure 15:
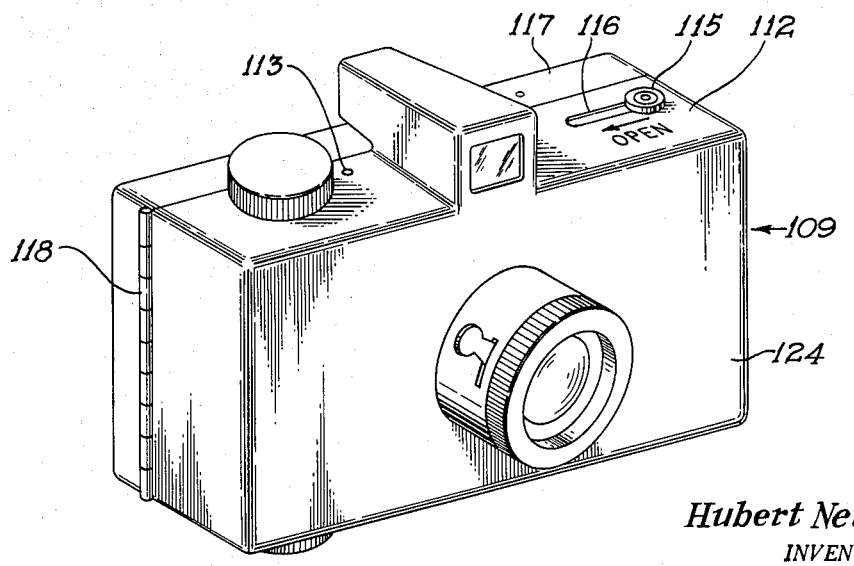
FIG. 15 is a perspective view of a camera embodying the mechanism shown in FIG. 14.

*Code responsive camera adjustment means.*—FIGS. 14 and 15 show the mechanism and external construction of a simple camera 109 in which the lens diaphragm opening is automatically set in accordance with the speed of the film in the magazine installed in the camera. This camera corresponds substantially in appearance and basic construction to that shown in FIG. 10 and is loaded in the same manner previously described.

The cover latching device employed in the camera comprises a latching member 111 slidably mounted beneath the top wall 112 of the camera housing by a rivet 113 on wall 112 engaging a slot 114 in the member, and by a latch operating element 115 extending through slot 116 in wall 112. The camera cover member 117 is hinged at 118 and is held in a closed position by the engagement of locking pin 119 thereon with a locking arm 120 on member 111, which, in turn, is urged toward the illustrated locking position by a spring 121 attached to a depending ear 122 of member 111 and to a mechanism plate 123 supported behind the front wall 124 of the camera housing. A control plate 125 is slidably attached to mechanism plate 123 by means of rivets 126 and is urged in the same direction as the latching member by a spring 127. A diaphragm operating pin 128 is carried by arm 129 of the control plate and engages slots 131 and 132 in the overlapping diaphragm blades 133 and 134 respectively, which are pivotally supported on the mechanism plate by a stud 135. Due to the angular relation of slots 131 and 132, the size of the lens aperture 136, determined by the overlapping relation of the blades, is increased as the control plate is moved toward the left as illustrated in the drawing, and is decreased as the plate is moved toward the right.

To open the camera, latch operating element 115 is moved to the left, thereby sliding locking arm 120 out of engagement with locking pin 119. As plate 111 is thus moved to its extreme left position, a depending lug 137 thereon engages a horizontal arm 138 on the control plate and likewise moves the control plate to its extreme left position, thereby moving the diaphragm blades to the position of maximum lens aperture. With the latch operating element held in the open position, a coded magazine 51 is installed in the camera as previously described and assumes the position shown in FIG. 14 relative to the camera mechanism. In this position, a pawl 139, pivotally mounted on arm 138 by a stud 141, is engaged by the left end of magazine rib 106 and is moved out of contact with lug 142 on arm 138 against the tension of a light spring member 143. The hinged cover member is then closed and retains the magazine in position as previously described. After the cover is moved to its closed position, latch operating element 115 is released, and is returned to its extreme right position by spring 121, to lock the cover. As member 111 moves to the locking position, control plate 125 also moves to the right under the influence of spring 127 until pawl 139 engages a coding notch 105 or some other form of coding discontinuity along rib 106 as shown in FIGS. 11, 12, and 13, thereby adjusting the lens aperture in accordance with the position of the coding means along the rib. Although the foregoing operation has been described with the latch operating element held in its left position as the magazine is installed, the latch element may be released prior to the installation of the magazine if desired, in which case pawl 139 engages the right end of rib 106. When the latching member is thereafter moved to the left to allow pin 119 to move past the end of arm 120 as the cover is completely closed, pawl 139 rides past the coding means by virtue of its angular disposition as it is moved along the rib to the left end thereof. When the latch element is then released, the pawl is blocked by the coding means during its return stroke as previously described. In either event, however, the magazine is engaged by the spring members on the cover member, as shown at 98 in FIG. 10, before the pawl moves toward the right along the rib, to insure that the magazine is held in engagement with the pawl during this operation.

Figure 16:
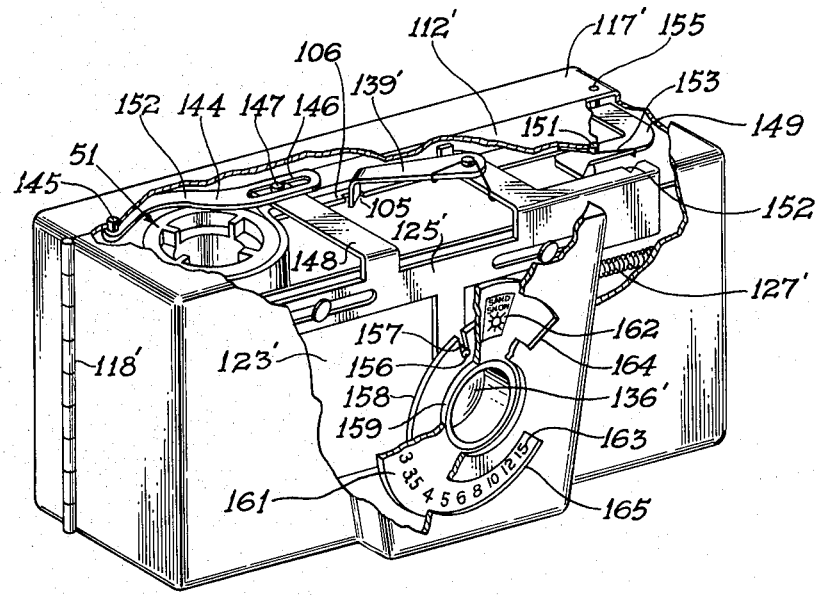
FIG. 16 is a perspective view of a camera with portions of the camera housing broken away to show a mechanism for adjusting an exposure indicating dial in response to the coding means on a magazine installed in the camera.
Figure 17:
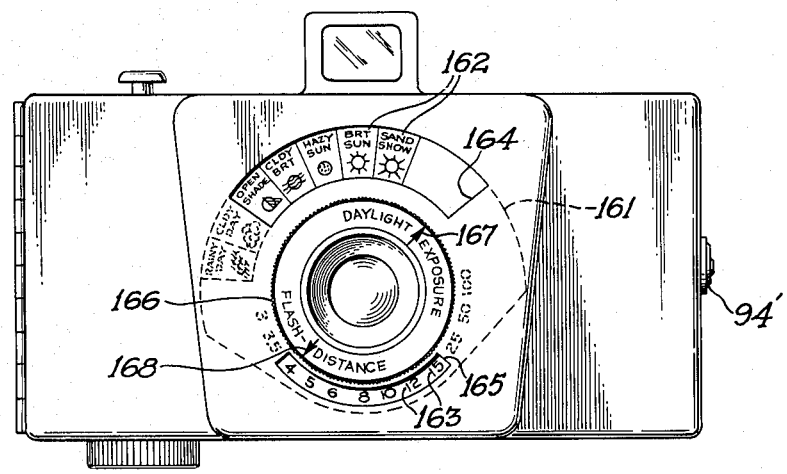
FIG. 17 is a front elevational view of the camera depicted in FIG. 16.

FIGS. 16 and 17 show an alternate camera construction whereby the code sensing means is actuated by opening the camera cover and adjusts an exposure guide scale in accordance with the speed of the film in the coded magazine. In this construction those elements designated by primed numerals are similar to the previously described correspondingly designated elements of FIG. 14. The control plate 125′ and the hinged cover member 117′ are connected by a linkage member 144 pivotally attached to the cover member 117′ by a pin 145 with a slot 146 in the linkage member in engagement with a stud 147 on arm 148 of the control plate. Thus, when the cover member is released by means of a latch 94′ corresponding to that shown in FIG. 10, and is moved to its fully opened position parallel to the camera housing, the right end of slot 146 engages stud 147 and slides control plate 125′ to its extreme left position, where it is held by a detent member 149 mounted on the top wall 112′ of the housing by a pin 151 and urged into engagement with a notch 152 in the control plate by spring 153. In order to allow the cover member 117 to be fully opened, linkage member 144 is curved as shown at 152 to clear the cover hinge 118′. With the cover in its open position, a coded film magazine is then installed in the camera as previously described with the left end of rib 106 in engagement with pawl 139′. As the cover is then returned to its closed position, slot 146 allows linkage member 144 to move relative to pin 147 without disturbing the position of the control plate. During the final stage of the cover closing operation, after the magazine has been engaged by the spring members 98 on the cover as shown in FIG. 10, a detent release pin 155 on the cover engages detent member 149 and moves it out of engagement with notch 152 to allow the control plate to be moved to the right by spring 127′ until the pawl encounters the coding means along rib 106.

In this embodiment of the invention, the control plate is provided with a pin 156 in engagement with radial slot 157 in disk 158, which is rotatably mounted on the mechanism plate 123′ by a sleeve member 159 coaxial with the camera lens system. Thus the angular position of disk 158 is determined by the magazine coding means. A second disk 161, is attached to disk 158 for movement therewith and is provided with exposure and flash indicating symbols 162 and 163, which are visible through arcuate apertures 164 and 165 respectively of the camera housing. FIG. 17 illustrates, for example, the position assumed by the symbols for a hypothetical film speed represented by a coding notch in the intermediate portion of rib 106. The shutter control ring 166, which regulates the diaphragm opening and/or the shutter speed, as is well known in the prior art, is provided with a daylight exposure index mark 167, which, when aligned with the symbol corresponding to the existing light conditions effects a proper setting of the shutter. Thus, the symbols visible in FIG. 17 indicate that a proper exposure may be made under all light conditions ranging from "Open Shade" to "Sand or Snow," by aligning the index mark with the appropriate symbol. If the magazine were loaded with slower film, the coding notch would be further to the left so that, for example, only those symbols designating light conditions of "Hazy Sun," "Bright Sun," and "Sand or Snow" would be visible, thereby indicating that proper exposures would be possible only under such lighting conditions. Conversely, a magazine coded for film of high sensitivity would cause the disk to be rotated clockwise so that, for example, the symbols for "Rainy Day" and "Cloudy Day" would also be visible, thereby indicating that proper exposures could be made under these conditions.

To facilitate the use of the camera with flash lamps, the indicia visible through window 165 indicate the distance range within which an exposure may be made with film of the type in the magazine with a particular type of lamp, and provide a simple means for adjusting the shutter for optimum results at any distance within the permissible range. For example, the position of the flash guide indicia 163 in window 165 of the camera shown in FIG. 17 indicates that the shutter can be adjusted for a properly exposed flash illuminated photograph of an object within a range of four to fifteen feet from the camera by aligning the flash distance index mark 168 on ring 166 with the numeral representing the distance to the object.

Figure 18:
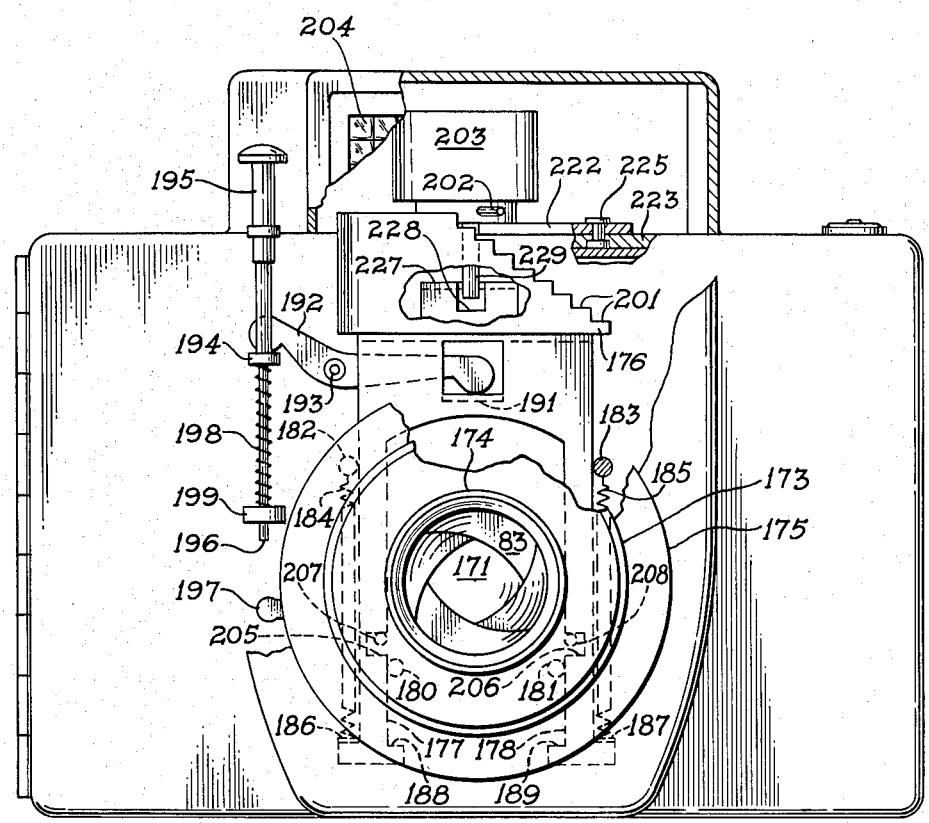
FIG. 18 is a front view of a camera, partly broken away, showing a photoelectric exposure control mechanism automatically adjustable in accordance with film sensitivity.

FIGS. 18 through 22 illustrate still another embodiment of the invention in which the automatic exposure control mechanism of a camera is automatically adjusted by the film speed coding means. In this embodiment, the camera includes a taking lens 171 arranged on an axis 172 and supported in a focusing member 173 mounted for rocking movement about a hub 174. On the rear surface of a shutter housing 175 a pointer sensing member 176 is arranged symmetrically relative to hub 174. The pointer sensing member 176 is adapted to slide vertically and for this purpose has a pair of arms 177 and 178, which are guided by a pair of lower studs 180 and 181 and a pair of upper studs 182 and 183. The upper studs 182 and 183 also serve as posts for a pair of springs 184 and 185, which are connected to respective ears 186 and 187 of the pointer sensing member and urge the latter in an upward direction as shown in FIG. 18. Respective lobes 188 and 189 are provided on arms 177 and 178 of the pointer sensing member for engagement with lower studs 180 and 181 to limit the upward travel of the sensing member.

On the upper portion of pointer sensing member 176 a projecting ear 191 is adapted for contact by one end of a rocker 192, which is pivotally mounted at 193. The other end of rocker 192 cooperates with a flange 194 on the camera actuating member 195, which is mounted for vertical movement on the front surface of the camera and has a bottom surface 196 adapted to contact the shutter release lever 197 for tripping the shutter after the pointer sensing member 176 has undergone its maximum upward movement in the manner described below. A compression spring 198, which is stronger than the combination of springs 184 and 185, is mounted on actuating member 195 between the lower surface of flange 194 and a fixed support 199. Spring 198, which is adapted for compression by manual depression of member 195, normally maintains that member in its uppermost position, thereby maintaining rocker 192 in its maximum clockwise position (as viewed in FIG. 18) and maintains pointer sensing member 176 in its lowermost position with springs 184 and 185 under tension.

A sloping upper edge 201 of pointer sensing member 176 is adapted to engage the pointer 202 of a measuring instrument 203 as the pointer sensing member is moved upwardly by springs 184 and 185 when actuating member 195 is manually depressed. The sloping edge 201 preferably is stepped, as shown in the drawings, in order to contact pointer 202 only in the direction of movement of pointer sensing member 176. The measuring instrument, along with a photocell 204 by which it is energized, constitutes an exposure meter. In a manner well known in the art pointer 202 is moved to the right (as viewed in FIGS. 18 and 20) in response to greater field brightness and therefore permits pointer sensing member 176 to move further upward before its sloping edge 201 contacts the pointer. Continued depression of actuating member 195, after pointer sensing member 176 contacts pointer 202, trips the shutter release lever 197.

Recesses 205 and 206 in the respective lower arms 177 and 178 of pointer sensing member 176 are respectively adapted to receive pin 207 on the shutter speed ring 209 adjacent member 176 and pin 208 which is integral with an arm 211 on a rotatable diaphragm ring 212 and which passes through a slot 213 in the shutter speed ring. Each of a plurality of diaphragm blades 214 is pivotally mounted at one of its ends at 215 to ring 212 and is connected at its other end to a stationary ring 216 by a pin 217 engaging a slot 218. Thus, as the diaphragm ring 212 is rotated in a counter-clockwise direction as viewed in FIG. 22, the size of the taking lens aperture is reduced. Likewise, the rotation of the shutter speed ring in a clockwise direction as viewed in FIG. 21, increases the shutter speed by virtue of the radial displacement of a shutter speed control pin 219 by cam surface 221 of slot 213. The shutter speed ring 209 and the diaphragm ring 212 are included within the term "exposure regulating devices," as that term is employed in the appended claims.

As the pointer member 176 moves upwardly, the lower surfaces of recesses 205 and 206 contact pins 207 and 208 and move them upwardly until the pointer sensing member is stopped by the instrument pointer 202. This movement rotates rings 209 and 212 clockwise and counterclockwise, respectively, to adjust both diaphragm opening and shutter speed as related functions of scene brightness.

From the foregoing it is seen that both diaphragm and shutter speed are adjusted during the upward movement of the pointer sensing member 176. These exposure factors are adjusted in the same sense, i.e., from larger to smaller diaphragm opening and from lower to higher shutter speed, or vice versa, so that the over-all exposure value is changed either from low to high or vice versa in response to upward movement of the pointer sensing member. If desired, additional means might, of course, also be provided to enable the diaphragm and shutter speed to be independently adjusted either manually or in response to the automatic exposure control device.

In order to compensate for changes in film speed in the exposure control system described above it has been found desirable to move the instrument body itself. However, in order that the approximate linearity achieved for the pointer sensing member (by forming its sensing surface in an arc of a circle) may be maintained at any position of the instrument body, i.e., for any film speed, the instrument body is moved in an arc of another circle concentric with that in which the pointer sensing member is formed. Obviously, if the pointer sensing surface is formed in a curve other than the arc of a circle the instrument body should be moved in a curve which is equidistant therefrom.

To allow the instument body to be so moved relative to the pointer sensing member, the instrument supporting plate 222 is slidably supported on wall member 223 of the camera by rivets 224 and 225 which pass through an arcuate guide slot 226 in member 223.

Figure 19:
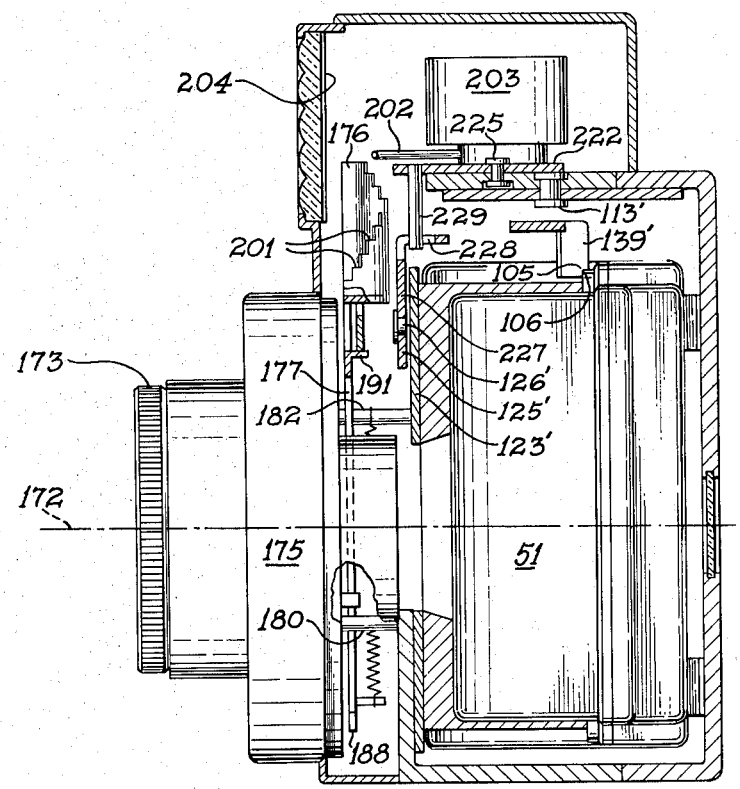
FIG. 19 is a side view, partly in section, of the structure shown in FIG. 18.

The illustrated mechanism employed to position the instrument 203 automatically as a function of the speed of the film in a magazine loaded into the camera is substantially identical to the mechanism employed in the embodiment shown in FIGS. 14 and 15, with the corresponding parts being designated in FIGS. 18 through 20 by primed numerals. In the latter embodiment, however, the diaphragm control arm 129 (FIG. 14) is replaced by an instrument adjusting arm 227 attached to the control plate 125' and provided with a slot 228 which receives the end of instrument positioning pin 229, attached to the instrument supporting plate 22. Thus, the installation of a coded magazine 51 into the camera determines the ultimate position of control plate 125' as previously described, and thereby appropriately positions the instrument 203 relative to the pointer sensing member.

Figure 23:
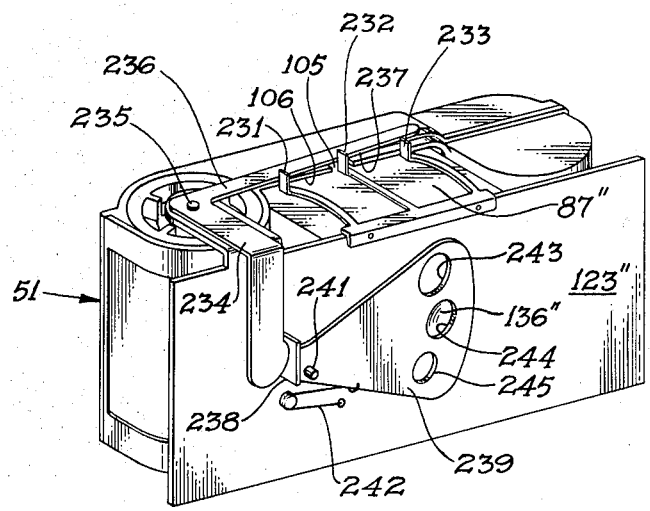
FIG. 23 is a perspective view of a camera mechanism for adjusting a diaphragm to one of three positions in response to the coding means on a film magazine installed in the camera.

FIGURE 23 illustrates still another device whereby a camera element may be automatically adjusted to one of three positions in accordance with the presence of a coding notch at one of three corresponding positions along rib 106 of the magazine. In the illustrated embodiment, this device employs three resilient fingers 231, 232, and 233 attached to the camera mechanism plate 123″. When the magazine 51 is installed in the camera, it is held in engagement with a box-like member 87″ in a manner previously described and as illustrated in FIG. 10, and those resilient fingers engaged by rib 106 are displaced toward the front of the camera. Whichever finger is aligned with the coding notch 105, however, remains in its rearward position; for example, as illustrated, fingers 231 and 233 are displaced, while finger 232 is received by coding notch 105.

A control lever 234 is pivotally attached to the mechanism plate at 235 and is provided with a horizontal arm 236 adjacent the resilient fingers. The straight contact surface 237 of the arm is aligned with pivot 235, as is the forward edge of rib 106, whereby the clockwise movement of the arm about pivot 235 is limited by whichever finger is in the rearwardmost position. Thus, the further the notch is located to the right, the further arm 236 may move in a clockwise direction before contacting one of the resilient fingers. The lower end of lever 234 contacts an ear 238 of a movable aperture blade 239 pivoted to the mechanism plate at 241 and urged in a counterclockwise direction by a light spring 242. Blade 241 is provided with three different sized apertures 243–245, movable into alignment with the camera lens 136″. Due to the location of pivot 241 relative to the point of contact between lever 234 and ear 238, spring 242 tends to urge arm 236 into contact with one of the fingers, but is of insufficient strength to displace the engaged finger.

When the magazine is removed from the camera, all of the fingers assume their rearwardmost position and arm 236 is rotated in a counter-clockwise direction about pivot 235 by finger 231, thereby rotating blade 239 in a clockwise direction against the influence of spring 242 to move the largest aperture 243 into alignment with the camera lens 136″. When the magazine is installed in the camera, however, arm 236 moves clockwise about its pivot under the influence of spring 242 according to which of the fingers are displaced by the rib. In the illustration, for example, arm 236 has moved into engagement with middle finger, thereby moving the aperture blade to bring the intermediate aperture 244 into alignment with the camera lens.

Although the illustrated embodiment shows only three resilient fingers responsive to a corresponding number of coding notches, it is obvious that a greater number of fingers and coding positions might be employed if desired. Likewise a single finger might be employed to merely detect the presence or absence of a coding notch in a particular position to adjust a camera element to one of two alternate positions.

Although the foregoing description relates to specific embodiments of the invention, it is obvious that variations and modifications thereof can be effected within the spirit and scope of the invention. For example, any of the above described code sensing mechanism, or modifications thereof, could be employed to automatically adjust any element of a camera where such an adjustment is required as a function of film speed. Accordingly, the present disclosure is to be considered as illustrative and not as limiting the scope of the invention which is defined by the following claims.

I claim:

1. In a camera having means therein for receiving a film magazine loaded thereinto, and an exposure control element adjustable to a position representing a characteristic of photographic film in said magazine; the combination comprising:
    a camera housing having back means movable to an open position for loading said magazine into said camera and to a position for retaining said magazine in said housing;
    means defining a tactile surface irregularity on said magazine, the position of said irregularity being a function of said characteristic of the film in said magazine;
    a sensing member in the camera movable to a first location in response to movement of said back means to said open position, and movable toward a second location in response to movement of said back means toward said retaining position, during which latter movement of said member the latter engages and is arrested by said surface irregularity;
    and means operatively connecting said element to said sensing member for moving said element in response to movement of said sensing member toward said second location.

2. In a camera adapted to be loaded with a film magazine having a tactile surface irregularity located at a position characteristic of the sensitivity of the film therein, the combination comprising:
    a camera housing having back means movable to an open position for loading said magazine into said camera and to a position for retaining said magazine in said housing;
    a movable code sensing member;
    means responsive to movement of said back means to said open position for moving said sensing member in one direction along a path from a first location to a second location;
    means operative in response to movement of said back means toward said retaining position for moving said member in the opposite direction along said path in which, when said magazine is in the camera, said member engages and is arrested by said surface irregularity on said magazine;
    an exposure control element adjustable to a position representing the sensitivity of film to be exposed in said camera;
    and means for adjusting said element in accordance with the arrested position of said sensing member.

3. In a camera adapted to be loaded with a film magazine having a tactile surface irregularity at a position characteristic of the sensitivity of the film therein, the combination comprising:
    a camera housing having back means movable to an open position for loading said magazine into said camera and to a position for retaining said magazine in said housing;
    a movable code sensing member;
    latch means movable to a latched position in which said back means is held in said retaining position and to a released position in which said back means can be opened;
    means responsive to movement of said latch means to said released position for moving said sensing member in one direction along a path from a first location to a second location;
    means operative upon movement of said latch means to said latched position for moving said sensing member in the opposite direction along said path in which, when a magazine is in the camera, said member engages and is arrested by said surface irregularity;
    an exposure control element adjustable to a position representing the sensitivity of film to be exposed in said camera;
    and means coupled to said sensing member for positioning said element automatically in accordance with the arrested position of said sensing member.

4. In a camera as defined in claim 3 wherein said adjustable exposure control element comprises overlapping pivotally supported diaphragm blades forming a lens diaphragm and defining an adjustable lens aperture, the size of said aperture being determined by the position to which said diaphragm blades are adjusted relative to each other.

5. In a camera adapted to be loaded with films of varying sensitivities each contained in a separate film magazine having a tactile surface irregularity at a position characteristic of the sensitivity of the film therein, the combination comprising:

a camera housing having back means movable to an open position for loading said magazine into said camera and to a position for retaining said magazine in said housing;

code sensing mechanism comprising:

a movable control member;

means for moving said control member from a first location to a second location in response to movement of said back means to said open position;

means operative in response to movement of said back means toward said retaining position for returning said control member toward said first location;

pawl means pivotally mounted on said control member and adapted, when a magazine is in the camera, to engage said surface irregularity and to arrest said control member as it is returned toward said first location;

an exposure control element adjustable to a position representing the sensitivity of film to be exposed in said camera;

and means coupled to said control member for adjusting said element in accordance with the arrested position of said control member.

6. In a camera adapted to be loaded with a film magazine having a tactile surface irregularity at a position characteristic of the sensitivity of the film therein, the combination comprising:

a camera housing having back means movable to an open position for loading said magazine into said camera and to a position for retaining said magazine in said housing;

a code responsive camera adjustment means comprising:

a control member movable in two directions along a predetermined path;

a linkage member pivotally connected to said back means and operably engageable with said control member for moving said control member in one direction from a first location to a second location as said back means is moved to said open position;

pawl means movably mounted on said control member;

detent means movably mounted on said camera for engaging and holding said control member in latched position at said second location;

detent release means on said back means adapted to engage and release said detent means from said latched position when said back means is moved toward said retaining position;

spring means for moving said control member and pawl means in the opposite direction toward said first location along a path in which, when a magazine is in the camera, said pawl means engages said surface irregularity on said magazine to arrest said control member;

an exposure control element adjustable to a position representing the sensitivity of film to be exposed in said camera;

and means operably connected to said control member for adjusting said element in accordance with the arrested position of said control member.

7. In a camera having means therein for receiving a film magazine loaded thereinto in a direction parallel to the optical axis thereof from the rear of the camera and an exposure control element adjustable to a position representing a characteristic of photographic film in said magazine, the combination comprising:

a camera housing having back means movable to an open position for loading said magazine into said camera and to a position for retaining said magazine in said housing;

an elongated forwardly facing surface on said magazine and extending substantially transversely to said optical axis;

means defining a tactile surface irregularity along said surface, the position of said irregularity being a function of said characteristic of the film in said magazine;

code sensing mechanism operably connected to and within said camera housing, comprising:

a movable control member;

means for moving said control member from a first location to a second location in response to movement of said back means to said open position;

means operative in response to movement of said back means toward said retaining position for returning said control member toward said first location;

pawl means pivotally mounted on said control member and adapted to engage said irregularity and to arrest said control member as it is returned toward said first location;

and means operatively connecting said element to said control member for causing movement of said element in response to the movement of said control member.

8. A camera having a pair of chambers spaced from each other by a rearwardly opening box-like member surrounding the camera optical axis and adapted to receive a film magazine having two spaced film chambers matching said pair of chambers and a portion between said film chambers adapted to cooperate with said box-like member to form a light-tight labyrinth, said portion having a tactile surface irregularity formed along its forward surface at a location outside of said labyrinth and representing the sensitivity of the film contained in said film magazine, said camera further having an exposure control element movable by a tactile code sensing mechanism to a position representing a characteristic of photographic film in said magazine; said tactile code sensing mechanism comprising:

a control member movable between first and second locations and biased toward said first location;

a pawl mounted on said control member for movement therewith and for movement relative to said control member between an inner position and an outer position substantially transverse to the movement of said control member and biased toward said inner position;

camera back means operatively connected to said control member for moving said control member from said first location to said second location;

said pawl adapted to engage and move along the forward surface of said film magazine portion in said outer position until it engages said surface irregularity on said magazine and as a consequence of which said pawl moves into said inner position to arrest further movement of said control member toward said first location;

and means operatively connecting said control member to said element for positioning said element in accordance with the arrested position of said control member.

9. In a camera having a pair of chambers spaced from each other by a rearwardly opening box-like member surrounding the camera optical axis, said chambers being adapted to receive respective end portions of a film magazine, said camera further having an exposure control element adjustable to a position representing a characteristic of photographic film in said magazine, the combination comprising:
   an intermediate portion on said magazine connecting said end portions and adapted to cooperate with said box-like member to form a light-tight labyrinth;
   tactile code means formed along the forward surface of said intermediate portion and located outside of said labyrinth, said code means representing the sensitivity of film contained in said magazine;
   movable means operatively connected to said element and disposed within said camera and along the outside of said box-like member along one side thereof and movable in a path parallel to said one side in engagement with said forward surface of said intermediate portion and adapted to be arrested in its movement along said path by engagement with said code means;
   and means for moving said movable means along said path.

10. In a camera having means therein for receiving a film magazine and an exposure control element adjustable to a position representing the sensitivity of photographic film in said magazine, the combination comprising:
   film magazine wall means defining a pair of film chambers arranged to project forwardly into said camera;
   rib means on said film magazine extending between said film chamber wall means and arranged to project forwardly into said camera;
   tactile code means on the forward surface of said rib means, the position of said code means along said rib means being a function of the sensitivity of the film in said magazine;
   a control member slidable along a path between two locations representing the range of possible element adjustments and including means coupled to said element to transmit the extent of movement of said control member to said element;
   camera back means on said camera operatively connected to said control member to move said control member from one of said two locations as said back means is moved to an open position;
   spring means connected to said control member and adapted to move the latter to the other of said two locations as said back means is moved to a position for retaining said magazine in said camera;
   and pawl means operatively connected to and movable with said control member and adapted to sense and engage the tactile code means on a film magazine loaded into said camera and to arrest said control member as it is moved along said path to said other of two locations by said spring means.

11. In a camera having means therein for receiving a film magazine and having an exposure control element adjustable to a position representing the sensitivity of photographic film in said magazine, the combination comprising:
   film magazine wall means defining a pair of film chambers and adapted to project forwardly into said camera when the magazine is loaded therein;
   rib means on said film magazine and extending between said film chamber wall means and adapted to project forwardly into said camera;
   tactile code means on the forward surface of said rib means, the position of said code means along said rib means being a function of the sensitivity of the film in said magazine;
   code sensing mechanism coupled to said element and biased into engagement with said rib means, said sensing mechanism being movable along said rib means into arresting engagement with said code means, said element being moved in accordance with the extent said sensing mechanism is moved;
   and means for moving said sensing mechanism along said rib means.

12. In a camera havings means therein adapted for receiving a film magazine loaded therein into a direction parallel to the optical axis thereof from the rear of the camera and having an exposure control element adjustable to a position representing the sensitivity of photographic film in said magazine, the combination comprising:
   film magazine wall means defining a pair of film chambers and arranged to project forwardly into said camera when the magazine is loaded therein;
   rib means on said film magazine extending between said film chamber wall means and arranged to project forwardly into said camera;
   tactile code means on said rib means, the position of said tactile code means along said rib means from one of said pair of film chamber wall means being a function of the sentivity of the film in said magazine;
   projecting means on said camera adapted to enclose the optical axis of said camera and having a rearward opening;
   means on said magazine adapted to engage over said rearward opening to form a light-tight labyrinth therewith and located said magazine relative to said camera means;
   a control member disposed along one side of said projecting means and reciprocably movable along a path between two locations representing the range of possible element adjustments;
   sensing means mounted on said control member and movable therewith and adapted to be biased against said rib means of said magazine for movement along the surface thereof until engaging said tactile code means to arrest movement of said control member;
   means on said camera operatively connected to said control member on the one hand and to said element on the other hand to adjust said element in accordance with the extent of movement of said control member;
   and means on said camera operatively connected to said control member for reciprocably moving said control member along said path.

13. In combination with a film magazine; a camera having means therein for receiving such film magazine and having an exposure control element positionable in accordance with the sensitivity of photographic film in said magazine, the combination comprising:
   a forwardly projecting elongated external rib on said magazine; said rib having therein a code notch, the position of the notch along said rib being a function of the sensitivity of the film in said magazine;
   camera back means movable to an open position and a position for retaining said magazine in said camera;
   means in said camera interrelating said back means and said magazine, when the later is in said receiving means, for urging said magazine toward the front of the camera in response to movement of said back means to said retaining position;
   and sensing means in said camera cooperating with said rib of said magazine, only when the latter is in said receiving means and said back means is in said retaining position, for determining the position of said element in accordance with the position of said notch.

14. A camera having means therein adapted to receive a film magazine of the type provided with a forwardly projecting elongated external rib having a code notch therein, the position of the notch along the rib being a function of the sensitivity of the film in the magazine, said camera comprising an exposure control element adjustable in accordance with said sensitivity;

camera back means movable to an open position and to a position for retaining a magazine in said camera;

means for interrelating said back means with a magazine, when the latter is in said receiving means, to urge such magazine toward the front of the camera and into a normal operating position in response to movement of said back means to said retaining position;

and sensing means in said camera adapted to cooperate with the rib of a magazine when, and only when, a film magazine is in such normal operating position and in said receiving means and said back means is in said retaining position, for determining the position of said element in accordance with the position of the code notch along such rib.

15. In combination with a film magazine; a camera having means therein for receiving such film magazine and having an exposure control element adjustable in accordance with the sensitivity of photographic film in said magazine; the combination comprising:

a forwardly projecting elongated external rib on said magazine; said rib having therein a code notch, the position of the notch along said rib being a function of the sensitivity of the film in said magazine;

means in said camera movable into engagement with said film magazine for urging said magazine and its rib toward the front of the camera;

and means in said camera operable for effecting a predetermined adjustment of said element in response to the non-alignment of said notch with said operable means when said magazine is in said receiving means and is urged toward the front of the camera; said operable means being non-operable when said notch is in alignment therewith.

16. In a camera adapted to be loaded with a film magazine having coding means located at a position characteristic of the sensitivity of the film therein, the combination comprising:

a camera housing;

a movable code sensing member disposed within said housing;

means in the camera for moving said code sensing member in one direction along a path from a first location to a second location preparatory to loading a film magazine in said housing;

means in the camera for moving said code sensing member in the opposite direction toward said first location along a path in which, after a film magazine has been loaded in said housing, said member engages and is arrested by said coding means on said magazine;

an exposure control element movable to predetermined positions in compensation for the sensitivity of film to be exposed in said camera;

and means in the camera for moving said element to one of said predetermined positions in accordance with the arrested position of said sensing member.

17. A camera adapted to be loaded with a film magazine having coding means located thereon at a position indicative of the sensitivity of the film therein, said camera comprising:

camera back means movable to an open position and to a position for retaining a magazine in said camera;

an exposure control element movable to predetermined positions in accordance with the sensitivity of film to be exposed in said camera;

means for interrelating said back means with a magazine, when the latter is in said camera, to urge such magazine toward the front of the camera and into a normal operating position in response to movement of said back means to said retaining position;

and code sensing means adapted to cooperate with a magazine when, and only when, a film magazine is in such normal operating position in said camera and said back means is in said retaining position, for determining the position of said element in accordance with the position of the coding means on such magazine.

18. In a camera, the combination comprising: an exposure meter including a photocell adapted to be illuminated by field light, and an electrical measuring instrument electrically connected to said cell, said instrument having a pointer angularly movable about a pivot as a nonlogarithmic function of field brightness; a pointer sensing member having a curved surface with a sensing edge; a manually operable camera actuating member; means coupling said actuating member to said sensing member for yieldably moving said sensing member in a predetermined path, in response to operation of said actuating member, to engage said sensing edge with said pointer, the shape of the curved surface of said sensing member being such that the path of its sensing edge intersects, at approximately equal-spaced points, respective loci assumed by said pointer in response to successive geometrically progressing values of field brightness, thereby compensating substantially for the nonlogarithmic relation between field brightness and angular movement of said pointer; means for moving said measuring instrument to compensate for changes in an exposure factor; means for guiding said instrument for movement in a path such that the pivot of said pointer remains substantially equidistant from the curved surface of said sensing member, thereby to maintain said substantial compensation at any position of said instrument along its path, within a predetermined range of such positions; at least one exposure regulating device; means coupling said sensing member to said exposure regulating device for adjusting the latter as a function of the extent of movement of said sensing member; means in said camera for receiving a film container having a surface irregularity, the position of said irregularity on said container surface being a function of the exposure index of photographic film in said container; and locating means coupled to said instrument, and disposed for cooperation with said container surface when said container is in said receiving means, for limiting the movement of said instrument to a position corresponding to said exposure index.

19. The combination defined in claim 18 wherein said surface irregularity comprises means defining a notch, and wherein said locating means comprises a control plate, with: resilient means urging said control plate in a first direction; manually operable means for overcoming said resilient means to move said control plate in a second direction; a pawl pivotally mounted on said control plate; and resilient means urging said pawl into engagement with said notch.

20. A camera having means therein adapted to receive a film magazine of the type provided with a forwardly projecting elongated external rib having a code notch therein, the position of the notch along the rib being a function of the sensitivity of the film in the magazine, said camera comprising:

an exposure control element adjustable in accordance with the sensitivity of photographic film in said magazine;

means in said camera movable into engagement with a film magazine, when such magazine is in said camera, for urging such magazine and its rib toward the front of the camera and into a normal operating position;

and means in said camera operable for effecting a predetermined adjustment of said element in response to the nonalignment of a notch with said adjustment-effecting means when a magazine is in said receiving means and is urged toward the front of the camera into such normal operating position; said adjustment-effecting means being non-operable when a code notch is in alignment therewith.

References Cited by the Examiner

UNITED STATES PATENTS

| | | | |
|---|---|---|---|
| 2,043,901 | 6/1936 | Mihayli | 95—10 |
| 2,080,055 | 5/1937 | Martin | 95—10 |
| 2,186,611 | 1/1940 | Martin | 95—10 |
| 2,186,613 | 1/1940 | Mihalyi | 95—10 |
| 2,320,722 | 6/1943 | Frost | 95—10 |
| 2,493,928 | 1/1950 | Rath | 95—10 |
| 3,025,777 | 3/1962 | Wilkenson | 95—10 |

FOREIGN PATENTS 456,783   7/1944   Belgium.

NORTON ANSHER, *Primary Examiner.*

EVON C. BLUNK, *Examiner.*